N. Waterman,
Fluting Iron,

N° 39,765.        Patented Sep. 1 1863.

Witnesses:
F. P. Hale, Jr.
Frederick Curtis.

Inventor:
Nath'l Waterman
by his attorney
R. H. Eddy.

UNITED STATES PATENT OFFICE.

NATHANIEL WATERMAN, OF BOSTON, MASSACHUSETTS.

IMPROVED RUFFLE-IRON.

Specification forming part of Letters Patent No. 39,765, dated September 1, 1863.

*To all whom it may concern:*

Be it known that I, NATHANIEL WATERMAN, a citizen of the United States of America, and a resident of Boston, in the county of Suffolk and State of Massachusetts, have invented an improved ruffle-iron or implement for smoothing ruffles or various other parts of clothes or apparel; and I do hereby declare the same to be fully described in the following specification, and represented in the accompanying drawings, of which—

Figure 1:
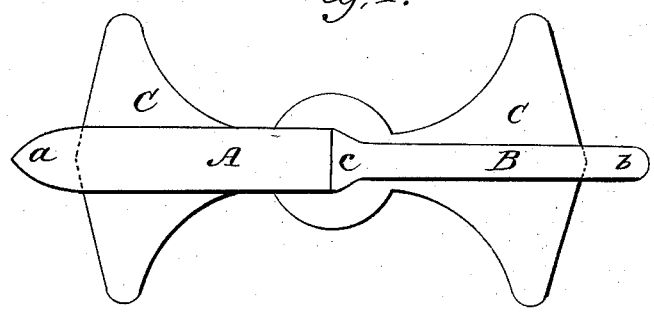
Figure 2:
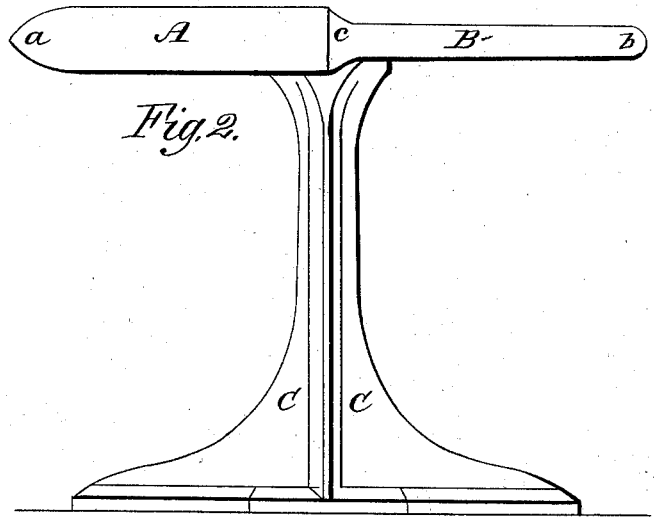

Figure 1 is a top view, and Fig. 2 a side elevation, of it.

The nature of my invention consists principally in a combination of one or more auxiliary ruffle or puffing irons with a ruffle or smoothing iron and its stand, the same being in manner substantially as hereinafter specified. The ordinary ruffle-iron is made with a socket for the reception of a heated cylinder or rod, from which the ruffle-iron derives its heat.

In course of using the ruffle-iron it frequently happens that the heater has to be removed and reheated to redness, in consequence of which such heating-iron becomes either destroyed or materially damaged by the heat.

For the process of ironing or smoothing a ruffle and fluting or puffing it, two separate irons with two pairs of heaters therefor, making, in all, six pieces, have been necessary. With my invention, however, the whole operation is accomplished with one instrument, which, instead of being heated by separate heaters placed within it, or in cavities formed in it, is to be laid on a stove with the smoothing part in contact with the heated surfaces thereof, or they may be heated in the manner in which ordinary solid sad-irons are commonly heated. When once heated, they will retain the heat for a long period of time.

The main and auxiliary smoothing parts, or the smoothing and puffing irons of my improved ruffle-iron, are solid without sockets, they being shown at A and B, and as arranged in line with each other, and projected in opposite directions from a stand, C. Each of the parts A B is cylindrical and terminates at its outer extremity in a rounded or somewhat conical end, as shown at $a$ or $b$. At their junction the longer is rounded down concavely toward the other, as shown at $c$, the said part $c$, as well as each of the conical or rounded ends $a\,b$, answering a good purpose in smoothing or ironing.

I claim—

The improved ruffle-iron, made substantially as described.

NATHL. WATERMAN.

Witnesses:
R. H. EDDY,
F. P. HALE, Jr.